US011057595B2

(12) United States Patent
Sivakumar et al.

(10) Patent No.: US 11,057,595 B2
(45) Date of Patent: Jul. 6, 2021

(54) PROJECTION ON MULTIPLE PLANES USING A SINGLE PROJECTION UNIT

(71) Applicant: Texas Instruments Incorporated, Dallas, TX (US)

(72) Inventors: Ganapathy Sivakumar, Allen, TX (US); Zhongyan Sheng, Allen, TX (US); Terry Alan Bartlett, Dallas, TX (US); John Marshall Ferri, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/600,240

(22) Filed: Oct. 11, 2019

(65) Prior Publication Data

US 2020/0260057 A1     Aug. 13, 2020

Related U.S. Application Data

(60) Provisional application No. 62/803,241, filed on Feb. 8, 2019.

(51) Int. Cl.
| | |
|---|---|
| *H04N 9/31* | (2006.01) |
| *G06K 9/00* | (2006.01) |
| *G02B 27/14* | (2006.01) |

(52) U.S. Cl.
CPC ......... *H04N 9/3147* (2013.01); *G02B 27/141* (2013.01); *G06K 9/00228* (2013.01); *H04N 9/3155* (2013.01); *H04N 9/3164* (2013.01)

(58) Field of Classification Search
CPC combination set(s) only.
See application file for complete search history.

(56) References Cited

U.S. PATENT DOCUMENTS 9,581,883 B2 *   2/2017   Smits ................... H04N 9/3185
9,858,719 B2     1/2018   Dorner
(Continued)

OTHER PUBLICATIONS

Lee, "Hybrid Infrared and Visible Light Projection for Location Tracking," Proceedings of the 20th Annual ACM Symposium on User Interface Software and Technology, UIST2007, pp. 57-60, USA, (Oct. 2007) Association for Computing Machinery, 1601 Broadway, 10th Floor, New York, NY 10019-7434 http://uist.acm.org/uist2007/ https://www.researchgate.net/publication/220876858.

*Primary Examiner* — Sultan Chowdhury
(74) *Attorney, Agent, or Firm* — Michelle F. Murray; Charles A. Brill; Frank D. Cimino (57) ABSTRACT

Described examples include an optical device having a first light source configured to provide a first light having a first characteristic. The optical device also has a second light source configured to provide a second light having a second characteristic. The optical device also has a combiner configured to combine the first light and the second light to provide a combined light. The optical device also has a spatial light modulator configured to modulate the combined light to provide modulated combined light. The optical device also has a divider configured to receive the modulated combined light and to direct a first portion of the modulated combined light having the first characteristic to a first target and to direct a second portion of the modulated combined light having the second characteristic to a second target.

22 Claims, 8 Drawing Sheets

(56) References Cited

U.S. PATENT DOCUMENTS

| | | | |
|---|---|---|---|
| 2012/0274745 A1* | 11/2012 | Russell | G06F 3/013 |
| | | | 348/46 |
| 2013/0100413 A1* | 4/2013 | Shina | G02B 27/1026 |
| | | | 353/7 |
| 2017/0277028 A1* | 9/2017 | Short | G03B 21/20 |
| 2018/0120562 A1* | 5/2018 | Yata | G02B 27/283 |
| 2018/0180886 A1* | 6/2018 | Holland | G03B 33/12 |
| 2018/0247037 A1* | 8/2018 | Weller | G06F 21/40 |

\* cited by examiner

PROJECTION ON MULTIPLE PLANES USING A SINGLE PROJECTION UNIT

CROSS-REFERENCE TO RELATED APPLICATIONS

This application claims the benefit under 35 U.S.C. § 119(e) to co-owned U.S. Provisional Patent Application Ser. No. 62/803,241, filed Feb. 8, 2019, entitled "SIMULTANEOUS INFORMATION DISPLAY ON MULTIPLE PLANES USING SINGLE PROJECTION UNIT," which is hereby incorporated by reference herein in its entirety.

TECHNICAL FIELD

This relates generally to projection devices and, in examples, to projection devices using spatial light modulation.

BACKGROUND

A wide variety of applications use projection devices. Projection of a video image is the most common application. Other applications include heads-up displays and advertising displays. Another application is recognition and ranging devices. For example, in facial recognition, a projector may project a known pattern onto a face for recognition. A camera or other sensor detects the reflection of the pattern off the face. The data from the camera is processed to determine if the face matches a face in a database. In many cases, an installation may include more than one projection-based technology. This requires a projector for each technology employed. Using multiple projectors adds cost and size to the installation.

SUMMARY

In accordance with an example, an optical device includes a first light source having a first light source output, wherein the first light source is configured to provide a first light having a first characteristic. The optical device also includes a second light source having a second light source output, wherein the second light source is configured to provide a second light having a second characteristic. The optical device also includes a combiner having a first input optically coupled to the first light source output, a second input optically coupled to the second light source output, and a combiner output, wherein the combiner is configured to combine the first light and the second light to provide a combined light on the combiner output. The optical device also includes a spatial light modulator having a spatial light modulator input optically coupled to the combiner output and having a modulated output, wherein the spatial light modulator is configured to modulate the combined light to provide modulated combined light on the modulated output. The optical device also includes a divider having a divider input optically coupled to the modulated output, wherein the divider is configured to direct a first portion of the modulated combined light having the first characteristic in a first direction and to direct a second portion of the modulated combined light having the second characteristic in a second direction.

DETAILED DESCRIPTION

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled." Elements referred to herein as "optically coupled" are elements that include a connection between the elements that involves transmission of light. Also, as used herein, the terms "on" and "over" may include layers or other elements where intervening or additional elements are between an element and the element that it is "on" or "over." Also, as used herein, a "combiner" is a device that combines two or more streams of light into one combined stream of light. Also, as used herein, a "divider" is a device that separates a stream of light stream into two or more streams of light.

In example arrangements, the problem of projecting onto two planes or targets is solved by using a divider at an output of a projection system to use one projection system to project onto two different planes or targets. Examples include an optical device having a first light source having a first light source output, wherein the first light source is configured to provide a first light having a first characteristic. The optical device includes a second light source having a second light source output that is configured to provide a second light having a second characteristic. The optical device has a combiner having a first input optically coupled to the first light source output, a second input optically coupled to the second light source output, wherein the combiner is configured to combine the first light and the second light to provide a combined light on a combiner output. The optical device includes a spatial light modulator having a spatial light modulator input optically coupled to the combiner output, wherein the spatial light modulator is configured to modulate the combined light to provide modulated combined light on a modulated output. The optical device also has a divider having a divider input optically coupled to the modulated output, wherein the divider is configured to direct a first portion of the modulated combined light having the first characteristic in a first direction and to direct a second portion of the modulated combined light having the second characteristic in a second direction.

Figure 1:
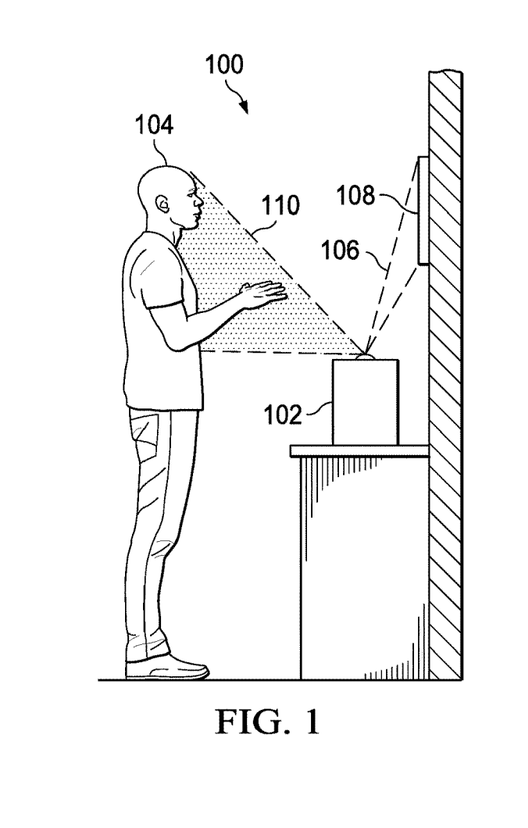
FIG. 1 is a diagram of an example system for display and identification.

FIG. 1 is a diagram of an example system 100 for display and identification. Projection unit 102 includes an optical device for projection of light. In one direction, Projection unit 102 projects visible light 106 onto a display target, such as screen 108. In this example, the display provided by visible light 106 onto screen 108 provides information such as instructions and error messages. Projection unit 102 also projects non-visible light, such as infrared light 110 onto a sensing target, such as user 104. In an example, infrared light 110 includes a pattern. Infrared light 110 reflects off the user 104. In other examples, light 106 and light 110 may be different colors of visible light. In other examples, light 106 and light 110 may differ by other characteristics such as polarization or phase. Sensor(s) (not shown) receive the reflected light of infrared light 110. A processor (not shown) in projection unit 102 analyzes the data from the sensor(s) to determine a biometric measurement and determine if the data matches stored biometric measurements of authorized users. Some arrangements use separate optical devices or engines to produce visible light 106 and infrared light 110. However, such arrangements have the expense of two or more optical engines and may be difficult to calibrate because of the two image sources.

Figure 2:
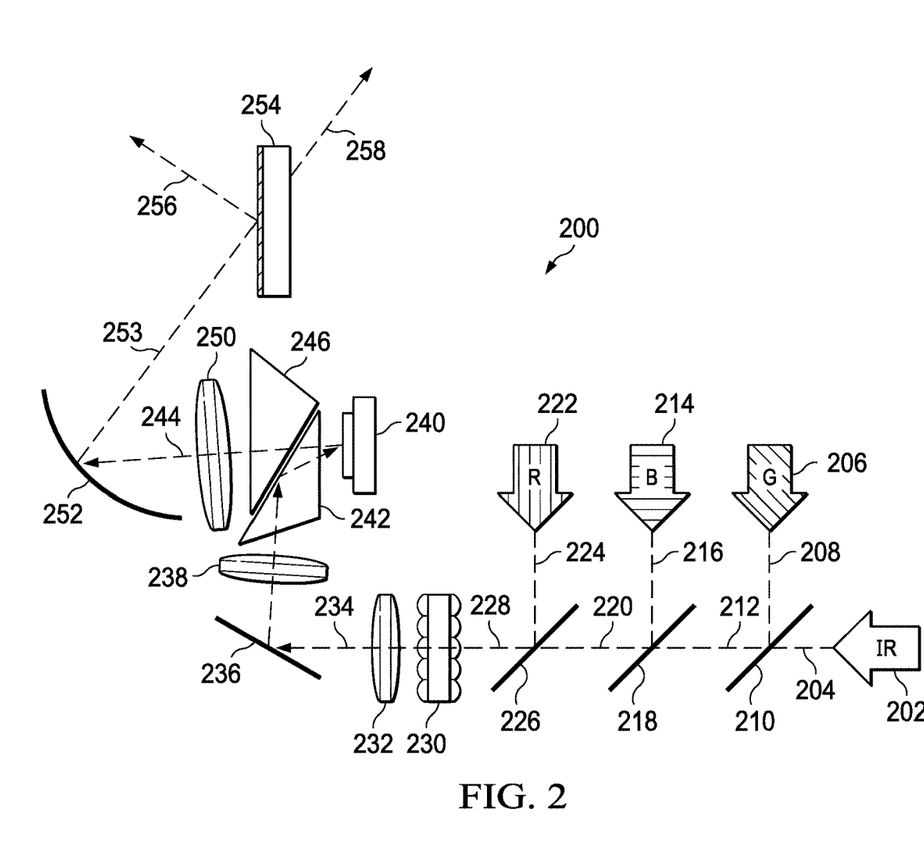
FIG. 2 is a diagram of an example optical device for producing two light streams or images.

FIG. 2 is a diagram of an example optical device 200 for producing two light streams or images. Infrared light source 202 produces infrared light 204. Green light source 206 produces green light 208. Green light 208 reflects off combiner 210, which serves as a first input of combiner 210. Combiner 210 passes infrared light 204, which serves as a second input of combiner 210. In this example, combiner 210 is a dichroic mirror angled at 45° relative to the path of green light 208. Thus, green light 208 reflects off combiner 210 onto the same path as infrared light 204 to produce combined light 212, which serves as an output for combiner 210. Blue light source 214 produces blue light 216. Combiner 218 combines blue light 216 and combined light 212 to produce combined light 220. In this example, combiner 218 is also a dichroic mirror. Red light source 222 produces red light 224. Combiner 226 combines red light 224 and combined light 220 to produce combined light 228. In this example, combiner 226 is also a dichroic mirror. Thus, combined light 228 includes red, green, blue and/or infrared light, depending on which of light sources 202, 206, 214 and 222 is on. As further explained hereinbelow, by controlling the timing of when infrared light source 202, green light source 206, blue light source 214 and read light source 222 are on or off, combined light 228 may include any combination of infrared light 204, green light 208, blue light 216 and/or red light 224. In this example, infrared light source 202, green light source 206, blue light source 214 and red light source 222 are light emitting diodes. In other examples, any or all of these light sources may be laser diodes, high-intensity incandescent light bulbs or other sources of light. In addition, in other examples, other types of combiners can be used, such as X-cubes.

Light integrator 230 integrates combined light 228. In this example, light integrator 230 is a fly's eye array. Lens (es) 232 and 238, along with the light integrator 230 and mirror 236, provide light 234 to uniformly illuminate the spatial light modulator 240. Light 234 reflects off one surface of prism 242 by total internal reflection (TIR), which serves as a spatial light modulator input. In this example, spatial light modulator 240 is a digital micromirror device. In other examples, spatial light modulator 240 may be another type of spatial light modulator, such a liquid-crystal on silicon (LCOS) device. Spatial light modulator 240 modulates light 234 to provide modulated light 244, which is a spatial light modulator output. Because modulated light 244 addresses the surfaces of prism 242 and cover prism 246 at an angle too great for TIR, modulated light 244 passes through prism 242 and cover prism 246 to mirror 252.

Projection optics 250 and mirror 252 focus modulated light 244 as projected light 253. In this example, mirror 252 is concaved, and thus has an optical power. In other examples, mirror 252 may be flat, convex or omitted. In the present example, the concave surface of mirror 252 allows for a more compact optical device 200. In this example, dichroic mirror 254 reflects light in a selected frequency band, such as infrared light and passes light in other frequency bands, such as visible light. Therefore, projected infrared light 256 reflects off dichroic mirror 254 in a first direction. Projected infrared light 256 is similar to infrared light 110 (FIG. 1). With the infrared portion of modulated light 244 removed, visible projected light 258 passes through dichroic mirror 254 in a second direction. Visible projected light 258 is similar to visible light 106 (FIG. 1). Dichroic mirror 254 thus functions as a divider with projected light 253 as an input.

Figure 3:
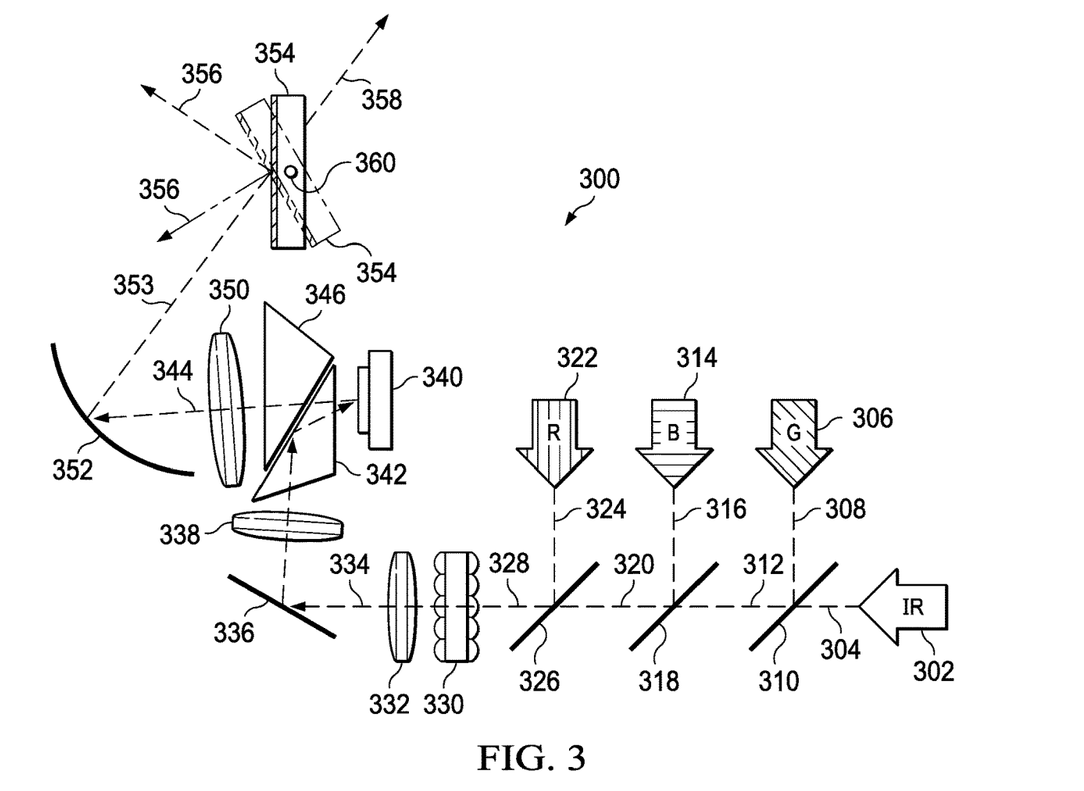
FIG. 3 is a diagram of another example optical device for producing two light streams or images.

FIG. 3 is a diagram of another example optical device 300 for producing two light streams or images. Infrared light source 302 is similar to infrared light source 202 (FIG. 2). Infrared light 304 is similar to infrared light 204 (FIG. 2). Green light source 306 is similar to green light source 206 (FIG. 2). Green light 308 is similar to green light 208 (FIG. 2). Combiner 310 is similar to combiner 210 (FIG. 2). Combined light 312 is similar to combined light 212 (FIG. 2). Blue light source 314 is similar to blue light source 214 (FIG. 2). Blue light 316 is similar to blue light 216 (FIG. 2). Combiner 318 is similar to combiner 218 (FIG. 2). Combined light 320 is similar to combined light 220 (FIG. 2). Red light source 322 is similar to red light source 222 (FIG. 2). Red light 324 is similar to red light 224 (FIG. 2). Combiner 326 is similar to combiner 226 (FIG. 2). Combined light 328 is similar to combined light 228 (FIG. 2). Thus, combined light 328 includes red, green, blue and/or infrared light. Light integrator 330 is similar to light integrator 230 (FIG. 2). Lens(es) 332 are similar to lens(es) 232 (FIG. 2). Collimated light 334 is similar to collimated light 234 (FIG. 2). Mirror 336 is similar to mirror 236 (FIG. 2). Lens(es) 338 are similar to lens(es) 238 (FIG. 2). Spatial light modulator 340 is similar to spatial light modulator 240 (FIG. 2). Prism 342 is similar to prism 242 (FIG. 2). Modulated light 344 is similar to modulated light 244 (FIG. 2). Cover prism 346 is similar to cover prism 246 (FIG. 2). Projection optics 350 is similar to projection optics 250 (FIG. 2). Mirror 352 is similar to mirror 252 (FIG. 2).

In this example, dichroic mirror 354 is similar to dichroic mirror 254 (FIG. 2) in that dichroic mirror 354 reflects infrared light and passes other light. Therefore, modulated infrared light 356 reflects off dichroic mirror 354. However, in this example, dichroic mirror 354 is movable. Thus, moving dichroic mirror 354 changes the direction of modulated infrared light 356. This allows for scanning with modulated infrared light 356. For example, in some face recognition schemes, a pattern scans across the user's face to enhance recognition capabilities. In the example of FIG. 3, dichroic mirror 354 rotates about an axle 360, and thus scans in a direction vertical to the page. In other examples, different mechanical configurations are employed to move dichroic mirror 354. Modulated infrared light 356 is similar to infrared light 110 (FIG. 1). With the infrared portion of modulated light 344 removed, visible modulated light 358 passes through dichroic mirror 354. Visible modulated light 358 is similar to visible light 106 (FIG. 1).

Figure 4:
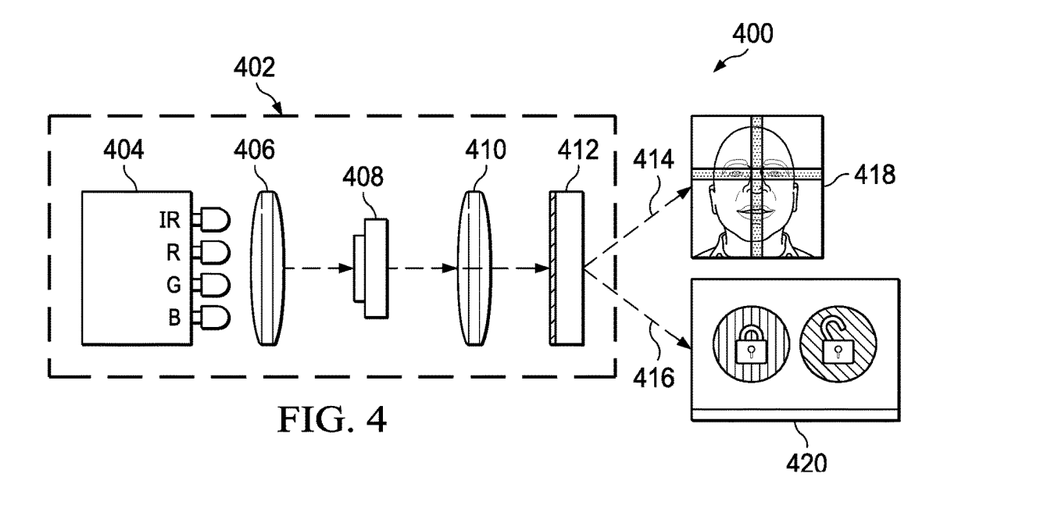
FIG. 4 is a conceptual diagram showing schematically the operation of example optical devices.

FIG. 4 is a conceptual diagram showing schematically the operation of optical device 200 (FIG. 2) and optical device 300 (FIG. 3). System 400 includes optical device 402. Light source 404 can provide infrared, red, green and blue light. Optics 406 provides uniform light to illuminate spatial light modulator 408. Spatial light modulator 408 modulates the light, as is further described regarding FIG. 5 hereinbelow, from optics 406 to produce an image 420 including a pattern 418 of infrared light. Projection optics 410 projects the modulated image from spatial light modulator 408. A divider 412 such as a dichroic mirror divides the modulated light into infrared light 414 to pattern 418 and visible light 416 (red, green and blue, and combinations thereof) to image 420. In other examples, divider 412 may divide the light according to other characteristics.

Figure 5:
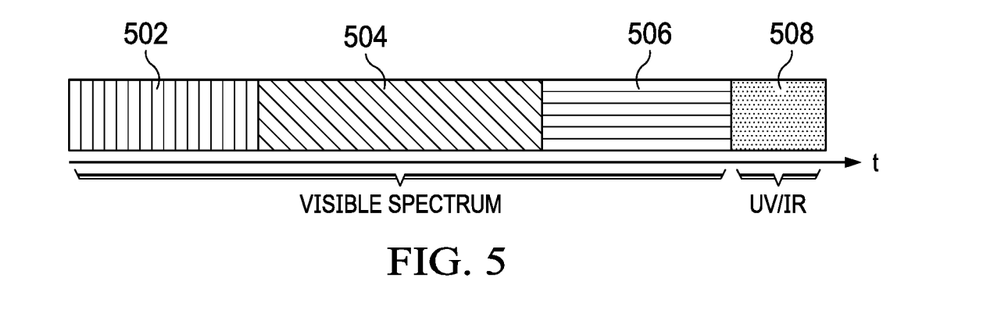
FIG. 5 is a timeline further describing the operation of the optical devices of FIG. 4.

FIG. 5 is a timeline further describing the operation of optical device 402 (FIG. 4). During red time period 502, light source 404 (FIG. 4) provides red light. During red time period 502, spatial light modulator 408 (FIG. 4) modulates each pixel so that each pixel of image 420 (FIG. 4) receives the intensity of red for the color and intensity of that pixel in image 420 (FIG. 4). During green time period 504, spatial light modulator 408 (FIG. 4) provides the intensity of green. During blue time period 506, spatial light modulator 408 (FIG. 4) provides the intensity of blue. The eye integrates the red, green and blue to the desired color and intensity for each pixel, and thus optical device 402 produces the desired image 420 (FIG. 4). During infrared time 508, light source 404 provides infrared light. During this time, spatial light modulator 408 (FIG. 4) modulates the infrared light to provide the desired intensity and pattern 418 (FIG. 4). In this example, pattern 418 (FIG. 4) is for facial recognition.

Figure 6:
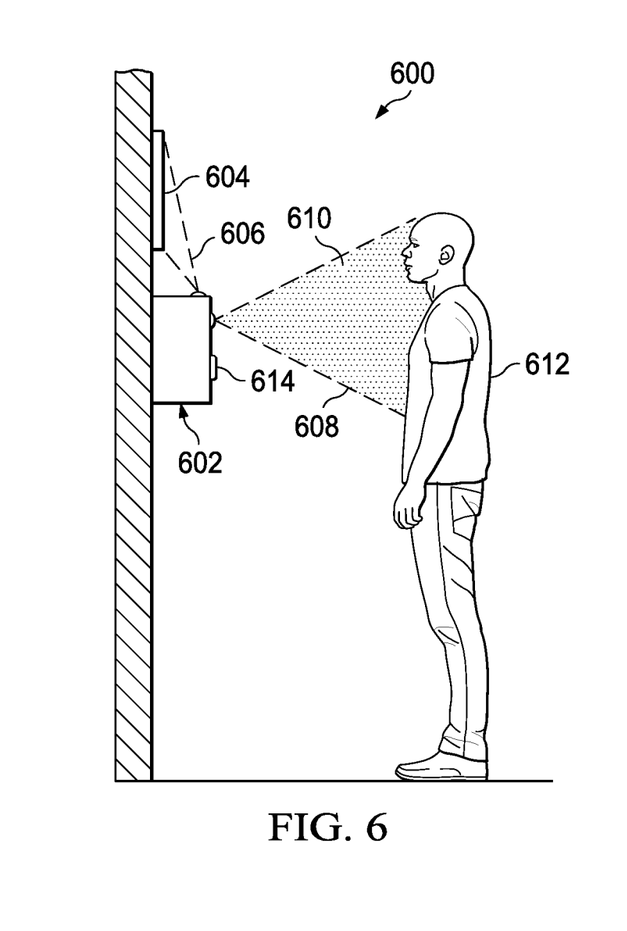
FIG. 6 is a diagram of an example facial recognition system.

FIG. 6 is a diagram of an example facial recognition system 600. Projection system 602 includes a projector configured to provide to light streams or images using one optical device such as optical device 200 (FIG. 2) or optical device 300 (FIG. 3). A short throw projection 606 from projection system 602 produces an image on screen 604. In this example, the images produced include visual cues to position the user's face, instructions and other messages from an access control system. Infrared projection 610 projects structured light (SL) patterns 608 onto the face of user 612. Sensors 614 receive reflections of SL patterns 608, which projection system processes to determine biometric measurements of the user 612, such as retinal patterns, and compare the biometric measurements to a database to determine if user 612 is authorized for access.

Figure 7:
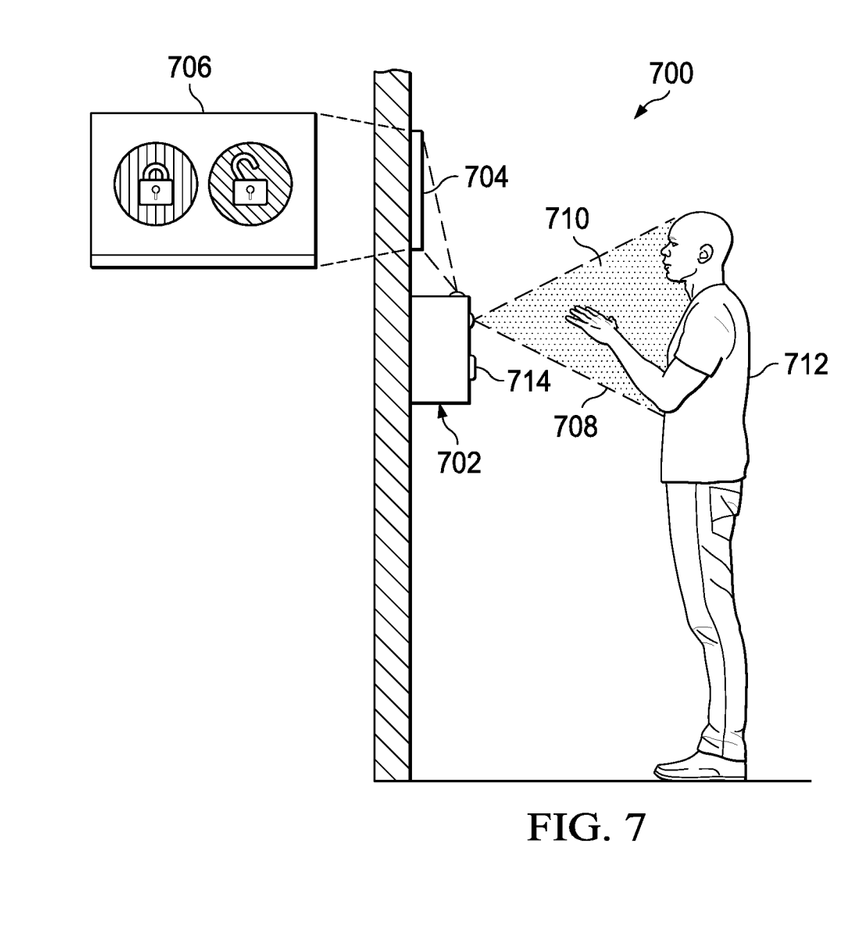
FIG. 7 is a diagram of an example gesture recognition system.

FIG. 7 is a diagram of an example gesture recognition system 700. Projection system 702 includes a projector configured to provide to light streams or images using one optical device such as optical device 200 (FIG. 2) or optical device 300 (FIG. 3). A short throw projection from projection system 702 produces an image 706 on screen 704. In this example, the images produced include locked or unlocked symbols, instructions and other messages from an access control system. Infrared projection 710 projects a field of patterns 708 through which user 712 gestures in a predetermined manner. Sensors 714 receive reflections of the patterns 708 that are processed to determine if the appropriated gesture was used and/or a determination of biometric measurements of user 712, such as hand size or shape. This information is processed to determine if user 712 is authorized for access.

Figure 8:
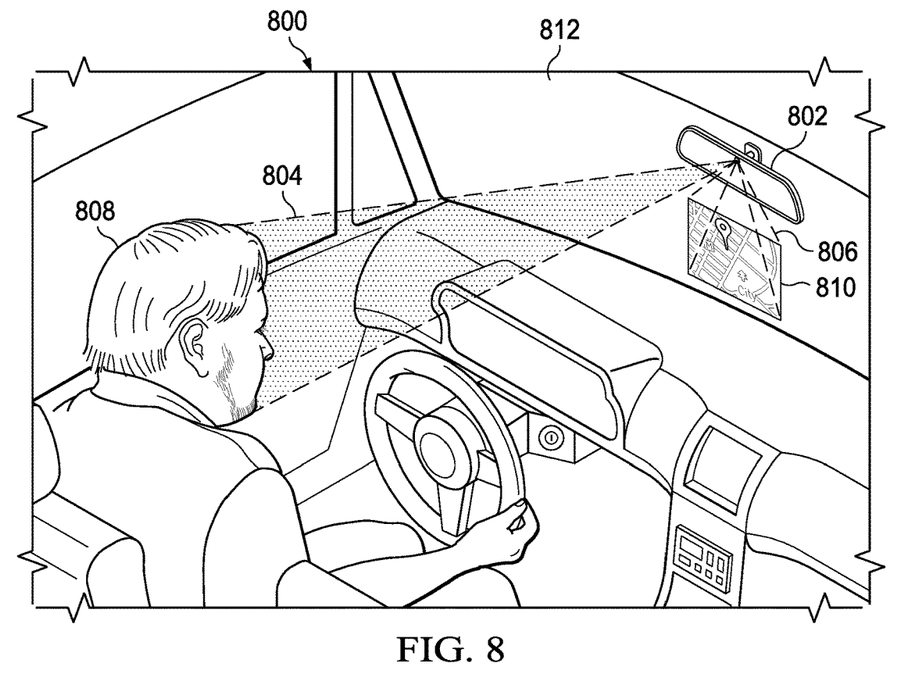
FIG. 8 is a diagram of an example arrangement using an optical device similar to that of FIG. 2 or FIG. 3.

FIG. 8 is a diagram of an example arrangement 800 using an optical device such as optical device 200 (FIG. 2) or optical device 300 (FIG. 3). In arrangement 800, the optical device is in rearview mirror 802. Visible light 806 projects head-up image 810 onto windshield 812. Head-up image 810 can provide information such as navigation directions, weather, or operational data for the automobile. Infrared light 804 projects onto the face of driver 808. Sensors (not shown) in the dashboard detect reflections of infrared light 804 off driver 808. This information is used to determine if the driver's 808 eyes leave the road, indicating distracted or drowsy driving, and then a warning can be issued to the driver 808. Using an optical device such as optical device 200 (FIG. 2) or optical device 300 (FIG. 3) in arrangement 800 allows for a compact and economical arrangement as opposed to the use of separate projection devices to produce infrared light 804 and visible light 806.

Figure 9:
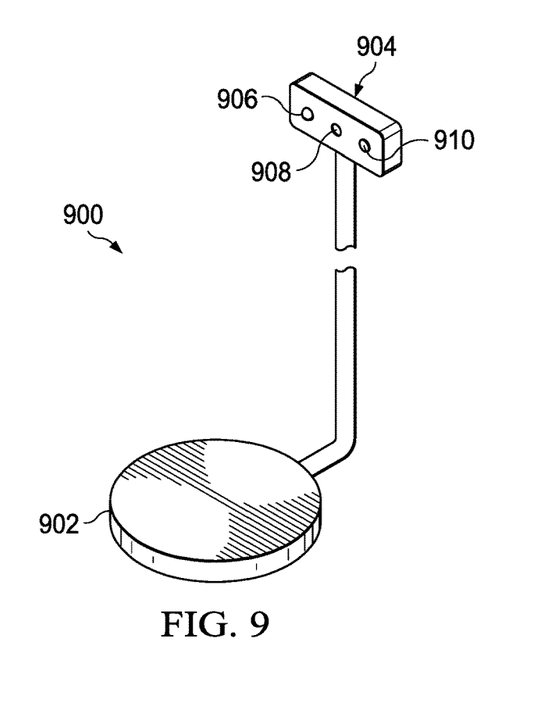
FIG. 9 is a diagram of an example health monitoring device.

FIG. 9 is a diagram of an example health monitoring device 900. The user stands on weight measurement platform 902, which determines the user's weight. Head unit 904 includes infrared sensors 906, RGB camera 908 and projector 910. Projector 910 is similar to optical device 200 (FIG. 2) or optical device 300 (FIG. 3) where the infrared signal projects onto the user. Visible light from projector 910 projects onto a screen (not shown) to provide instructions and results. Optical device 300 (FIG. 3) is particularly suitable for this application because it allows scanning of the infrared signal over the full body of the user. Using the user's body shape and posture allows for determining some medical conditions and indications of potential medical issues.

Figure 10:
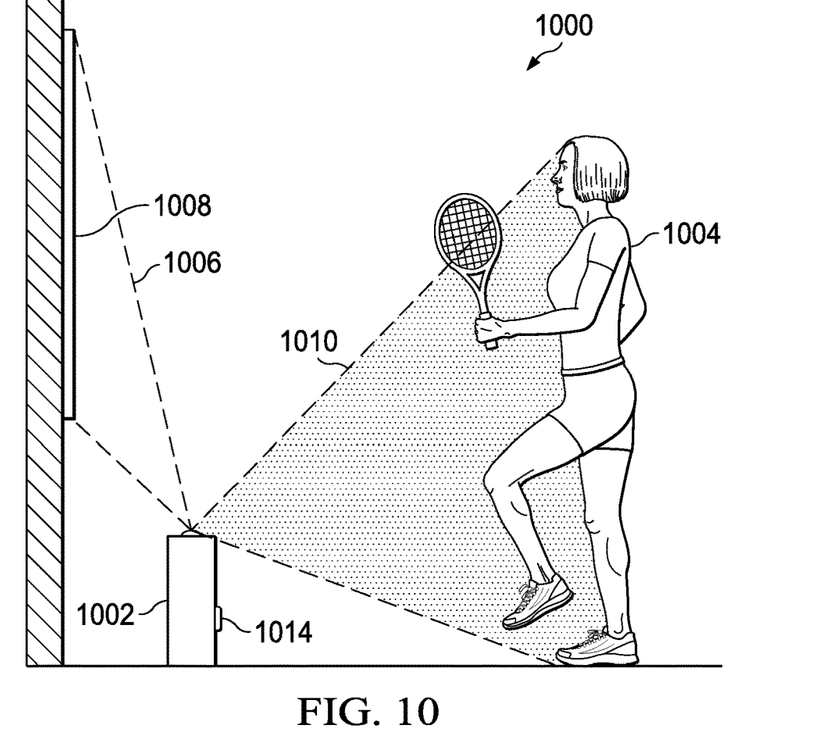
FIG. 10 is a diagram of an example virtual reality game.

FIG. 10 is a diagram of an example virtual reality game 1000. Projector 1002 includes an optical device such as optical device 300 (FIG. 3). Projector 1002 projects visible light 1006 onto screen 1008. Visible light 1006 projects a scene in which the user plays the virtual reality game. In the example of FIG. 10, user 1004 is playing tennis. User 1004 may play with an actual tennis racquet or a controller. Projector 1002 projects non-visible light 1010 onto user 1004. In this example, non-visible light 1010 is infrared light. Projector 1002 scans the user 1004 with patterns allowing for rapid determination of the position of user 1004. Sensors 1014 sense the portion of non-visible light 1010 reflected off user 1004 and determine the position of user 1004 many times a second. The sensors 1014 may or may not be located with projector 1002. Because the same spatial light modulator modulates both the visible light 1006 and non-visible light 1010 and because projector 1002 knows the projector settings, calibration between the image on screen 1008 and user 1004 is greatly simplified. This allows projector 1002 to more quickly determine the actions of user 1004, and thus the course of game play, to provide a more realistic experience.

Figure 11:
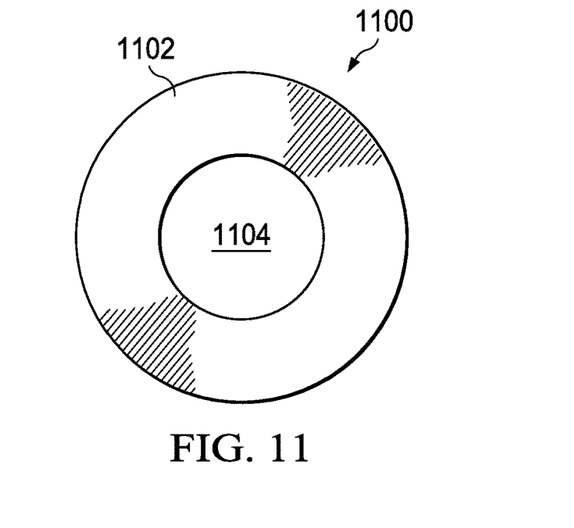
FIG. 11 is a diagram of an example aperture.

FIG. 11 is a diagram of an example aperture 1100. Aperture 1100 includes a flat doughnut or toroid shaped ring 1102 surrounding an opening 1104. In this example, ring 1102 is a dichroic material coated on a transparent material, such as glass. In this example, ring 1102 reflects or stops non-visible light such as non-visible light 1010 (FIG. 10). On the other hand, visible light such as visible light 1006 (FIG. 10) passes through ring 1102. With this configuration, the aperture for non-visible light is opening 1104. Thus, the aperture for non-visible light is small. The opening for visible light is at least the area of ring 1102 and opening 1104. Thus, the aperture for visible light is larger. In the example of FIG. 10, visible light 1006 (FIG. 10) projects onto a fixed screen. Thus, the depth of field necessary to project a focused image onto screen 1008 is small (e.g., a centimeter or two). A larger aperture allows more light but has a shallow depth of field. Because the visible light image in the example of FIG. 10 is on a fixed screen, a shallow depth of field is acceptable. In addition, greater light throughput provided a brighter projected image. Thus, a large aperture works well for visible light such as visible light 1006 (FIG. 10).

In contrast, the non-visible light, such as non-visible light 1010 (FIG. 10) projects on user 1004 (FIG. 10). User 1004 (FIG. 10) has a physical depth of at least 30 or so centimeters and is moving. Thus, it is useful to have a greater depth of field for non-visible light 1010 (FIG. 10) than for visible light 1006 (FIG. 10). Because opening 1104 limits the non-visible light, the non-visible light has a smaller aperture, and thus a greater depth of field. Thus, an aperture such as aperture 1100 provides a different the aperture for each projected image in an example application such as that of FIG. 10 that improves the functionality of each image.

Figure 12:
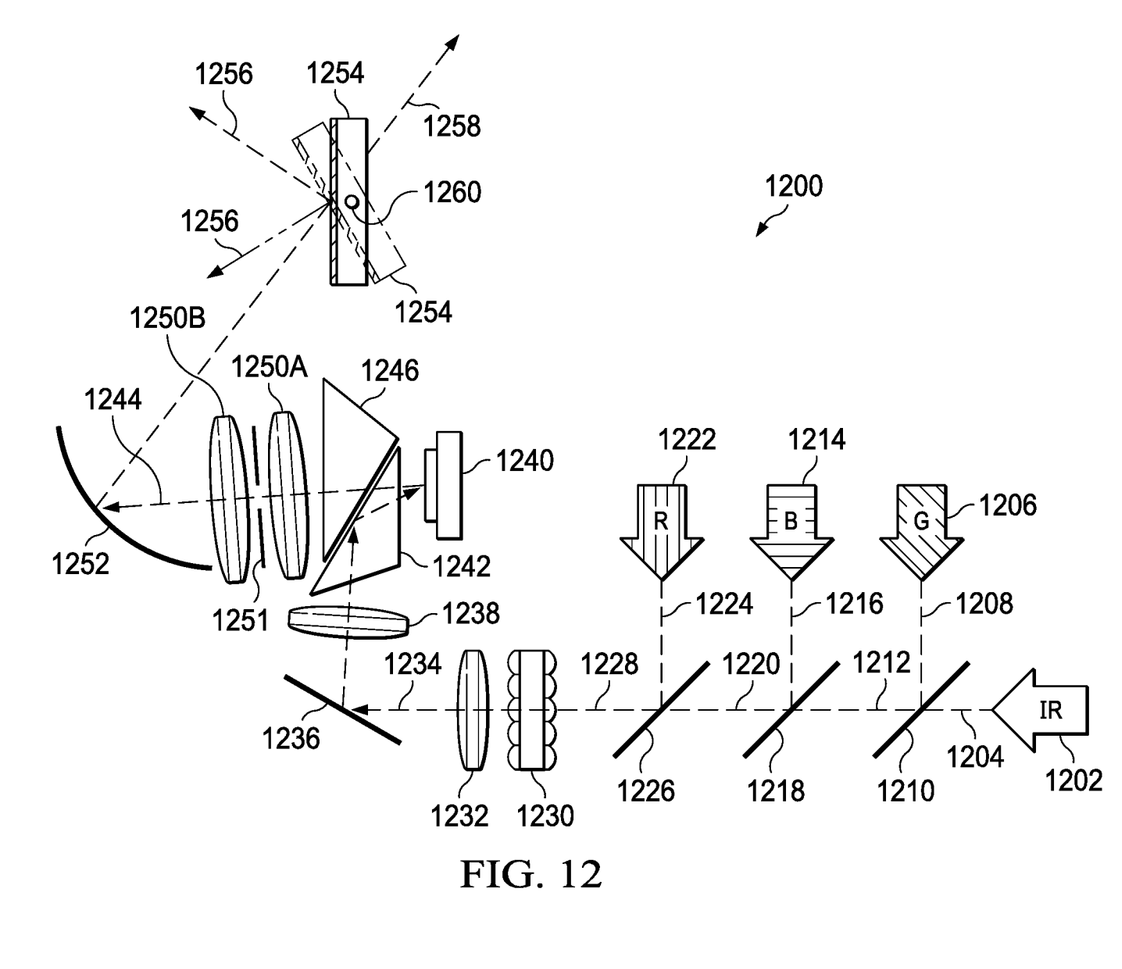
FIG. 12 is an example optical device using an example aperture similar to that of FIG. 11.

FIG. 12 is an example optical device 1200 using an aperture similar to aperture 1100 (FIG. 11). Infrared light source 1202 is similar to infrared light source 302 (FIG. 3). Infrared light 1204 is similar to infrared light 304 (FIG. 3). Green light source 1206 is similar to green light source 306 (FIG. 3). Green light 1208 is similar to green light 308 (FIG. 3). Combiner 1210 is similar to combiner 310 (FIG. 3). Combined light 1212 is similar to combined light 312 (FIG. 3). Blue light source 1214 is similar to blue light source 314 (FIG. 3). Blue light 1216 is similar to blue light 316 (FIG. 3). Combiner 1218 is similar to combiner 318 (FIG. 3). Combined light 1220 is similar to combined light 320 (FIG. 3). Red light source 1222 is similar to red light source 322 (FIG. 3). Red light 1224 is similar to red light 324 (FIG. 3). Combiner 1226 is similar to combiner 326 (FIG. 3). Combined light 1228 is similar to combined light 328 (FIG. 3). Thus, combined light 1228 includes red, green, blue and/or infrared light. Light integrator 1230 is similar to light integrator 330 (FIG. 3). Lens(es) 1232 are similar to lens(es) 332 (FIG. 3). Collimated light 1234 is similar to collimated light 334 (FIG. 3). Mirror 1236 is similar to mirror 336 (FIG. 3). Lens(es) 1238 are similar to lens(es) 338 (FIG. 3). Spatial light modulator 1240 is similar to spatial light modulator 340 (FIG. 3). Prism 1242 is similar to prism 342 (FIG. 3). Modulated light 1244 is similar to modulated light 344 (FIG. 3). Cover prism 1246 is similar to cover prism 346 (FIG. 3). Mirror 1252 is similar to mirror 352 (FIG. 3). Dichroic mirror 1254 is similar to dichroic mirror 354 (FIG. 3). Axle 1260 is similar to axle 360 (FIG. 3). Modulated infrared light 1256 is similar to non-visible light 1010 (FIG. 10). Visible modulated light 1258 is similar to visible light 1006 (FIG. 10).

Partial projection optics 1250A and partial projection optics 1250B are similar to projection optics 350 (FIG. 3) except that aperture 1251 is between partial projection optics 1250A and partial projection optics 1250B. Aperture 1251 is similar to aperture 1100. That is, aperture 1251 has a smaller aperture for infrared light than for visible light. Therefore, modulated infrared light 1256 has a greater depth of focus than visible modulated light 1258. In addition, visible modulated light 1258 has greater light throughput than modulated infrared light 1256.

Figure 13:
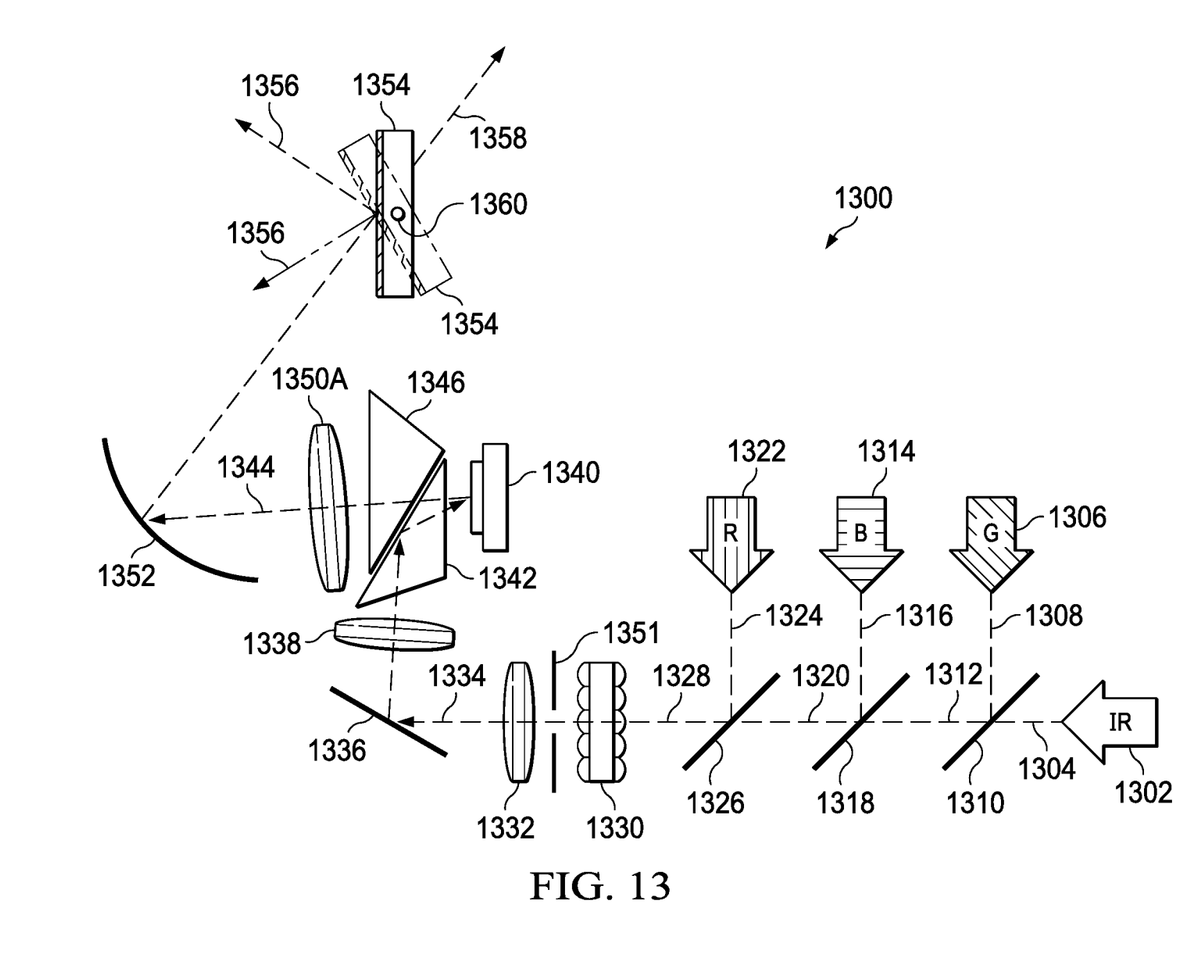
FIG. 13 is another example optical device using an example aperture similar to that of FIG. 11.

FIG. 13 is an example optical device 1300 using an aperture such as aperture 1100 (FIG. 11). Infrared light source 1302 is similar to infrared light source 302 (FIG. 3). Infrared light 1304 is similar to infrared light 304 (FIG. 3). Green light source 1306 is similar to green light source 306 (FIG. 3). Green light 1308 is similar to green light 308 (FIG. 3). Combiner 1310 is similar to combiner 310 (FIG. 3). Combined light 1312 is similar to combined light 312 (FIG. 3). Blue light source 1314 is similar to blue light source 314 (FIG. 3). Blue light 1316 is similar to blue light 316 (FIG. 3). Combiner 1318 is similar to combiner 318 (FIG. 3). Combined light 1320 is similar to combined light 320 (FIG. 3). Red light source 1322 is similar to red light source 322 (FIG. 3). Red light 1324 is similar to red light 324 (FIG. 3). Combiner 1326 is similar to combiner 326 (FIG. 3). Combined light 1328 is similar to combined light 328 (FIG. 3). Thus, combined light 1328 includes red, green, blue and/or infrared light. Light integrator 1330 is similar to light integrator 330 (FIG. 3). Lens(es) 1332 are similar to lens(es) 332 (FIG. 3). Collimated light 1334 is similar to collimated light 334 (FIG. 3). Mirror 1336 is similar to mirror 336 (FIG. 3). Lens(es) 1338 are similar to lens(es) 338 (FIG. 3). Spatial light modulator 1340 is similar to spatial light modulator 340 (FIG. 3). Prism 1342 is similar to prism 342 (FIG. 3). Modulated light 1344 is similar to modulated light 344 (FIG. 3). Cover prism 1346 is similar to cover prism 346 (FIG. 3). Projection optics 1350 is similar to projection optics 350 (FIG. 3). Mirror 1352 is similar to mirror 352 (FIG. 3). Dichroic mirror 1354 is similar to dichroic mirror 354 (FIG. 3). Axle 1360 is similar to axle 360 (FIG. 3). Modulated infrared light 1356 is similar to non-visible light 1010 (FIG. 10). Visible modulated light 1358 is similar to visible light 1006 (FIG. 10).

In optical device 1300, aperture 1351 is between light integrator 1330 and lens(es) 1332. Aperture 1351 is similar to aperture 1100. Like aperture 1100 and aperture 1251, aperture 1351 has a smaller aperture for infrared light than for visible light. Therefore, modulated infrared light 1356 has a greater depth of focus than visible modulated light 1358. In addition, visible modulated light 1358 has greater light throughput than modulated infrared light 1356.

Figure 14:
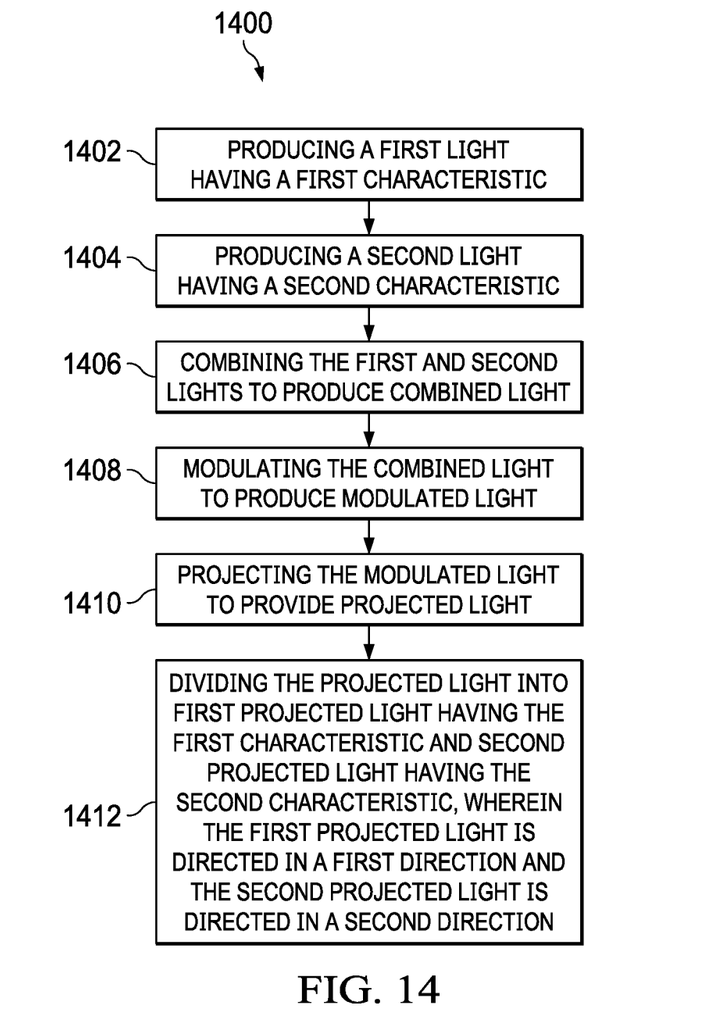
FIG. 14 is a flow diagram of an example process.

FIG. 14 is a flow diagram of an example process 1400. Step 1402 is producing a first light having a first characteristic. In an example, the first light is similar to infrared light 204 (FIG. 2). Step 1404 is producing a second light having a second characteristic. In an example, the second light is similar to green light 208, blue light 216 or red light 224 (FIG. 2), or a combination thereof. Step 1406 is combining the first and second light to produces combined light. The combined light is similar to combined light 228 (FIG. 2). Step 1408 is modulating the combined light to produce modulated light. A spatial light modulator similar to spatial light modulator 240 modulates the modulated light in an example to produce modulated light 244. Step 1410 is projecting the modulated light to provide projected light. Projection optics similar to projection optics 250 projects the modulated light to produce projected light similar to projected light 253. Step 1412 is dividing the projected light into first projected light having the first characteristic and second projected light having the second characteristic, wherein the first projected light is directed in a first direction and the second projected light is directed in a second direction. The first projected light is similar to projected infrared light 256. The second projected light is similar to projected light 258.

Modifications are possible in the described examples, and other examples are possible, within the scope of the claims.

What is claimed is:

1. An optical device comprising:
   a first light source configured to produce first light having a first characteristic;
   a second light source configured to produce second light having a second characteristic;

a combiner optically coupled to the first light source and to the second light source, wherein the combiner is configured to combine the first light and the second light to produce combined light having the first characteristic and the second characteristic;

a spatial light modulator optically coupled to the combiner, wherein the spatial light modulator is configured to modulate the combined light to produce modulated combined light having the first characteristic and the second characteristic; and a divider optically coupled to the spatial light modulator, wherein the divider is configured to direct a first portion of the modulated combined light having the first characteristic in a first direction and to direct a second portion of the modulated combined light having the second characteristic in a second direction, the second direction different than the first direction.

2. The optical device of claim 1, wherein the first direction is to a first target and the second direction is to a second target.

3. The optical device of claim 1, wherein the first characteristic is a first frequency band and the second characteristic is a second frequency band.

4. The optical device of claim 3, wherein the first characteristic is visible light and the second characteristic is infrared light.

5. The optical device of claim 1, wherein the spatial light modulator is a digital micromirror device.

6. The optical device of claim 1, further comprising an aperture having an opening and a ring, wherein the ring is configured to block light having the first characteristic and passes light having the second characteristic.

7. The optical device of claim 6, wherein the aperture is between the combiner and the spatial light modulator.

8. The optical device of claim 6, wherein the aperture is between the spatial light modulator and the divider.

9. The optical device of claim 1, wherein the first characteristic is a first color and the second characteristic is infrared, the combiner is a first combiner, the optical device further comprising:
a third light source configured to produce third light having a second color;
a second combiner optically coupled to the third light source and to the first combiner, the second combiner configured to reflect the third light having the second color, transmit the first light having the first color, and transmit the second light being infrared;
a fourth light source configured to produce fourth light having a third color; and
a third combiner optically coupled to the fourth light source, to the second combiner, and to the spatial light modulator, the third combiner configured to reflect the fourth light having the third color, transmit the first light having the first color, transmit the second light being infrared, and transmit the third light having the second color.

10. The optical device of claim 1, wherein the second light forms a structured light pattern, the optical device further comprising a sensor configured to detect a reflection of the structured light pattern.

11. A method comprising:
producing, by a first light source, first light having a first characteristic;
producing, by a second light source, second light having a second characteristic;

combining, by a combiner, the first light and the second light to produce combined light having the first characteristic and the second characteristic;
modulating, by a spatial light modulator, the combined light to produce modulated light having the first characteristic and the second characteristic;
directing, by a divider, a first portion of the modulated light having the first characteristic in a first direction; and
directing, by the divider, a second portion of the modulated light having the second characteristic in a second direction, the second direction different than the first direction.

12. The method of claim 11, wherein the first direction is to a first target and the second direction is to a second target.

13. The method of claim 11, wherein the first characteristic is visible and the second characteristic is infrared.

14. An apparatus comprising:
an aperture comprising:
a first portion configured to transmit light having a first characteristic and to transmit light having a second characteristic; and
a second portion surrounding the first portion, the second portion configured to transmit light having the first characteristic and to reflect light having the second characteristic.

15. The apparatus of claim 14, wherein the second portion is ring shaped.

16. The apparatus of claim 14, wherein the first characteristic is visible and the second characteristic is infrared.

17. The apparatus of claim 14, wherein the first portion comprises a transparent material and the second portion comprises a dichroic material on the transparent material.

18. The apparatus of claim 14, further comprising a spatial light modulator optically coupled to the aperture.

19. The apparatus of claim 18, further comprising:
a first light source configured to produce first light having the first characteristic;
a second light source configured to produce second light having the second characteristic; and
a combiner optically coupled to the first light source and to the second light source, wherein the combiner is configured to combine the first light and the second light to produce combined light having the first characteristic and the second characteristic;
wherein the spatial light modulator is configured to modulate the combined light to produce modulated combined light having the first characteristic and the second characteristic; and
wherein the aperture is configured to receive the modulated combined light and to pass a portion of the modulated combined light as passed modulated light.

20. The apparatus of claim 19, further comprising a divider optically coupled to the aperture, wherein the divider is configured to direct a first portion of the passed modulated light having the first characteristic in a first direction and to direct a second portion of the passed modulated light having the second characteristic in a second direction, the second direction different than the first direction.

21. The apparatus of claim 18, further comprising:
a first light source configured to produce first light having the first characteristic;
a second light source configured to produce second light having the second characteristic; and
a combiner optically coupled to the first light source and to the second light source, wherein the combiner is configured to combine the first light and the second light to produce combined light having the first characteristic and the second characteristic;

wherein the aperture is optically coupled to the combiner, the aperture configured to receive the combined light and to pass a portion of the combined light as passed combined light, and wherein the spatial light modulator is configured to modulated the passed combined light to produce modulated combined light.

22. The apparatus of claim 21, further comprising a divider optically coupled to the spatial light modulator, wherein the divider is configured to direct a first portion of the modulated combined light having the first characteristic in a first direction and to direct a second portion of the modulated combined light having the second characteristic in a second direction, the second direction different than the first direction.

* * * * *